Patented Oct. 18, 1949

2,484,828

UNITED STATES PATENT OFFICE 2,484,828

PRODUCTION OF CONTACT MATERIALS

John H. Hickey, Morton Grove, Ill., assignor to Great Lakes Carbon Corporation, Morton Grove, Ill., a corporation of Delaware No Drawing. Application July 5, 1946, Serial No. 681,603

4 Claims. (Cl. 252—450)

This invention relates to activated clays of improved character and to a novel method for the production thereof.

More specifically, the present invention relates to a novel process for the acid activation of clays of the bentonite type and to the improved properties of the resulting product.

It is an object of the present invention to provide activated clays having high catalytic activity and good heat stability and suitable for use as catalysts for hydrocarbon conversion processes.

A further object relates to hydrocarbon conversion processes employing the catalyst produced according to the present invention.

A further object of this invention is to produce activated clays which are useful for liquid or gaseous phase contact adsorbents for aqueous or organic impurities in oils, fats, petroleum products, etc., or as decolorizing agents for edible oils, sugar refining, process waters and the like.

It is generally known that clays of the type herein contemplated may be activated by treatment with mineral acids, such as, hydrochloric acid, sulfuric acid, etc. However, I have found that the employment of a novel sequence of steps in the treatment of clay with mineral acids under particular conditions of temperature will produce an activated clay having improved properties of catalytic activity, heat stability and adsorptive capacity.

The process of the present invention is characterized by, and in one specific embodiment comprises a two stage treatment, the first stage of which comprises treating clays with a relatively cool aqueous solution of acid so as to react the acid with the clay, and thereafter separate the resulting solution from the clay. The thus reacted and separated clay is thereafter treated in a second stage with a heated aqueous solution of acid so that the acid will be caused to further react with the clay, after which the resulting solution is separated from the treated clay and the latter is washed with water.

More specifically, a method of producing the activated clay of the present invention suitable for use as a hydrocarbon conversion catalyst comprises reacting a clay at a temperature of from about 10° C. to about 40° C. with an aqueous solution of a mineral acid of from about 2% to about 15% acid content and thereafter separating the resulting solution from the clay. The thus reacted and separated clay is treated with a fresh aqueous solution of mineral acid of from about 5% to about 15% acid content and at a temperature of from about 80° C. to the boiling point of the mixture, thereafter separating the resulting solution from the treated clay, washing the latter with water and then drying and calcining the resultant activated clay.

Bentonite clays, of which the usually characteristic mineral is montmorillinite, are the clays generally employed in the practice of this invention, although there are other clays in which montmorillinite appears and the latter may also be similarly activated by the process disclosed herein. These clays have a definite microcrystalline structure in which magnesium, aluminum and silicon form a part of the crystal lattice, and in the interplanar areas between the lattices, in addition to a variable amount of water, there are also such elements as, the alkali metals, calcium, magnesium, etc., which are associated with the lattice in an ionic or base-exchange relationship. Very often detrital matter, such as the carbonates of magnesium, calcium, and iron, as well as other impurities, are also present in the clays in varying but appreciable amounts which must be taken into account in any activation process. The process of clay activation, as generally understood, involves the removal of (1) the detrital impurities, (2) the base-exchangeable ions, (3) the lattice water, (4) a part of the lattice magnesium, (5) a part of the lattice aluminum, and (6) little if any of the lattice silicon. It appears that the catalytic activity of a clay is not greatly developed until the crystal lattice is affected.

The prior art on clay activation with acids has been concerned with the foregoing removals carried out simultaneously under conditions of heating with one or more increments of heated acid.

I have discovered that when the clay is conditioned, so to speak, by first reacting it with an aqueous mineral acid under particular conditions which do not permit attack upon its crystal lattice but which removes to some extent or "loosens" the foregoing described clay components (1) and (2), and perhaps to some degree component (3), without appreciable activation of the clay, and then separating therefrom the reacted acid solution and reaction products soluble therein, that a substantially better activation of the clay will result in a subsequent acid activation of such conditioned clay.

A characterizing feature of my process for activating clay is the particular condition under which the clay is first treated or "conditioned" for activation. This step comprises reacting the natural clay in pulverulent form with diluted mineral acid in a relatively cool or unheated condition, that is to say, at normally atmospheric or prevailing plant temperatures, and such temperature may be from about 10° C. to about 40° C. The concentration of aqueous acid which I generally employ may be from about 2% to about 7%, preferably about 2.5–5%. Alternatively, however, it is often desirable to first mull the raw clay to a smooth paste with a higher concentration of acid having an acid content of from about 7% to about 15%, preferably at about 10%, and immediately thereafter add sufficient water to reduce the acid concentration to from about 2% to about 5% for completion of the reaction with the clay. The amount of anhydrous acid employed in solution per pound of volatile matter-free clay is usually in slight excess over that required to react with detrital matter, such as carbonates, and in some degree with the base exchange ions or other interplanar impurities of the clay lattice. Under the conditions of temperature here employed, any excess of acid does not appreciably react with the lattice components. The amount of anhydrous acid required in its aqueous solution plus a sufficient excess will be, depending upon composition of the clay, from about 0.05 lb. to about 0.15 lb. anhydrous acid per lb. of volatile matter-free clay. The time of contact of the unheated aqueous acid with the clay, during which the mixture is well agitated, will be from about 15 minutes to about 60 minutes. In this treatment the clay remains substantially unactivated. However, the clay is so affected, the nature or extent of which is not particularly understood, that when further acid treated under activating conditions there results a markedly improved activated clay.

After the foregoing treatment with unheated aqueous acid, the reacted clay is separated, for example, by settling and decanting, from the resulting solution containing soluble clay reaction products. To secure the improved activation of the separated reacted clay in the second treatment step with a fresh supply of aqueous mineral acid under activating conditions, the reacted clay from the first acid treatment need not be washed, and it is ready in its moist separated condition for activation by the further treatment with mineral acids.

The second step of my process of activating clay consists in treating the foregoing reacted clay with an aqueous mineral acid solution under conditions of heating at a temperature of from about 80° C. to the boiling point of the mixture. The concentration of the aqueous acid here employed is from about 5% to about 15% acid and the concentration I generally employ is about 10%. The amount of anhydrous acid employed in solution per pound of volatile matter-free clay is from about 0.1 pound to about 0.6 pound. The reaction of the acid in this step is such as to cause the activation of the clay which involves, among other things, the removal of part of the aluminum from the crystal lattice of the clay. As much as about 50% of the lattice aluminum may be removed before disintegration of the lattice commences and the degree of activation rapidly falls off. A maximum level of clay activation is reached when from about 20% to about 45% of the lattice aluminum is removed. In order to secure maximum yields of activated clay amounting to about 80–85% of the raw dry clay, I prefer to remove only about 20–30% of the lattice aluminum and for this reason prefer to employ in the heated treating step, depending somewhat on composition of the clay, about 0.3 pound to about 0.4 pound anhydrous mineral acid (in about 10% aqueous solution) per pound of volatile matter-free reacted clay from the first (unheated) treating step. The time of treating with heated acid is from about 5 to 7 hours. The resulting activated clay is then water washed to remove unreacted acid and soluble acid-clay reaction products and dried. For employment as a catalyst the dried activated clay may then be calcined at a temperature of about 400° C. to about 600° C., depending upon the process in which it is to be employed.

I may employ the same or a different aqueous mineral acid for each the described treating steps. For instance, I may use hydrochloric acid for the unheated treating of the clay and use sulfuric acid thereafter in the heated treating thereof, or I may use either hydrochloric or sulfuric acid in both of the steps. Other acids such as nitric or phosphoric acid may in the alternative be employed, although not with fully equivalent results. The only apparent provision is that the reacted clay be at least drained free of the first unheated reacted acid solution or it may be further water washed before applying the second and unused quantity of acid solution with heating.

The following is an example of a procedure within the scope of the present invention which has been employed for activating a bentonite clay from the Ash Meadows deposit. To 100 parts by weight of the finely crushed or pulverized clay was added 70 parts by weight of a 10% aqueous solution of hydrochloric acid. The clay and acid were mulled to a smooth paste at room temperature (about 25° C.), immediately after which 200 parts by weight of water at approximately the same temperature was added and the mixture agitated about 30 minutes and then filtered. The treated clay filter cake was broken up and added to 400 parts by weigth of hot 10% aqueous solution of sulfuric acid, heated at boiling for six hours, diluted with water and filtered, and further water washed several times until substantially free from unreacted acid and water soluble clay-acid reaction products. The final washed activated clay was dried and was then ready for use as an adsorbent or decolorizing agent, or for calcination to produce a hydrocarbon conversion catalyst.

I have found that the catalytic activity and heat stability of my activated clays, for example, in the catalytic conversion of a petroleum distillate, such as gas oil under cracking conditions, is superior to that of commercially available activated clay catalysts, which in general are the products of the direct hot acid activation of bentonite clays in which the clay is treated directly at about 90–105° C. with a 15% sulfuric acid solution in amount corresponding to approximately 0.3 pound anhydrous acid per pound of volatile matter-free clay for a period of approximately 6 hours, followed by water washing, drying and grinding the resulting activated clay. I have found that even under the best conditions of clay activation employed by others, the development of the greatest activity and heat stability of the product cannot be attained by prior known methods.

In a procedure, for example, for determining the catalytic cracking activity of activated clay catalysts, Mid-Continent gas oil of specific gravity 0.831 was contacted with catalysts at about 500° C. and atmospheric pressure using a feed rate of approximately 5.25 volumes oil per volume of powdered catalyst per hour in a two hour process period. The activity value of 100 was assigned to a commercial activated clay, previously calcined one hour at 500° C. for its activity in producing 400° F. end point gasoline under the above conditions. Under the same conditions of cracking, my calcined activated clay has a catalytic activity of 140. The heat stability, which reflects the useful life period of the catalyst under cyclic conditions of cracking and combustion regeneration of the catalyst to remove fouling carbonaceous deposits, was determined by first calcining each of the above activated clays at 700° C. for 6 hours and then making the above catalytic test with each. The catalytic activity of the commercial catalyst dropped to 53 while that of my activated clay was reduced only to 87. After many times repeated processing and regeneration at temperatures reaching 600–650° C. the activity of my catalyst remained substantially above its heat stability of 87 with no appreciably diminished effect throughout the many process periods.

In the use of solid contact materials, such as activated clays, for catalytic conversion or adsorption processes, the activated clay becomes fouled with carbonaceous or adsorbed products with the result that its efficiency becomes diminished to the extent that it is no longer practicable to use. The fouled activated clay must then be cleaned or regenerated, such as by combustion with oxygen-containing gases at temperatures sometimes reaching 650–700° C. which are considerably in excess of that employed for hydrocarbon conversions. The use of an activated clay then generally involves a cyclic operation consisting of processing and regenerating steps. The constant application of high temperatures, especially during regeneration, tends to deactivate the solid contact material as the result of a sintering effect upon the solid which causes collapse of its porous structure with a consequent decrease in its available active surface areas. The resistance of a solid contact material to sintering and deactivation at high temperatures is referred to as heat stability. It is in this property as well as initial activity that I have found that my activated clays are superior to other known activated clays and because of such improved heat stability my product will have a longer useful life in all types of cyclic hydrocarbon conversion or adsorption processes than might be expected from other activated clays heretofore known.

My activated clay is therefore especially suited for catalytic hydrocarbon conversion processes such as, catalytic cracking for the production of high octane motor fuels, olefin polymerization, hydrogen transfer reactions for reducing the olefin content of light petroleum distillates, reforming thermally cracked or olefinic gasolines to improve the octane number thereof, and the like. For example, the catalytic reforming of an olefinic gasoline to improve its octane number has been done as follows. A thermally cracked gasoline having an octane number of 67 was contacted with my activated clay at approximately 500° C. at a space velocity of 5 volumes liquid gasoline per volume of the clay catalyst with the result that the octane number increases to 69.5.

I claim as my invention:

1. A process of producing activated clay which comprises treating a bentonite clay by mulling it at about 10 to about 40° C. with an aqueous mineral acid of about 7 to about 15% concentration and in the proportion of about 0.05 to about 0.15 pound of concentrated acid per pound of clay to form a pasty mass, adding water sufficient to dilute the acid to form about 2% to about 5% concentration, separating the resultant reacted solution from the clay, treating the clay with an aqueous solution of mineral acid of from about 5 to about 15% acid concentration in a dosage corresponding to about 0.1 to about 0.6 pound of concentrated acid per pound of clay, said treatment being carried out at a temperature within the range of about 80° C. to about the boiling point of the solution, separating the resultant solution from the clay and washing the thus treated clay.

2. A process of producing a catalytically active body which comprises reacting a bentonite clay at about 10° C. to about 40° C. with about 0.05 to about 0.15 pound of a mineral acid per pound of clay, said acid being of about 2% to about 15% concentration in water, separating the resultant solution from the clay, further reacting the clay with an aqueous solution of a mineral acid of about 5% to about 15% concentration in an amount corresponding to about 0.1 to about 0.6 pound of concentrated acid per pound of clay, at a temperature of about 80° C. to the boiling point of said solution, separating the resultant solution from the clay, washing the clay, and then drying it.

3. The process of claim 2 wherein the acid is sulfuric.

4. The process of claim 2 wherein the acid is hydrochloric.

JOHN H. HICKEY.

REFERENCES CITED

The following references are of record in the file of this patent:

UNITED STATES PATENTS

| Number | Name | Date |
|---|---|---|
| 1,913,960 | Roll | June 13, 1933 |
| 2,078,945 | Houdry | May 4, 1937 |
| 2,207,145 | Doht | July 9, 1940 |
| 2,391,312 | Ewing et al. | Dec. 18, 1945 |
| 2,400,020 | Pierce et al. | May 7, 1946 |
| 2,445,370 | Spicer et al. | July 20, 1948 |